Patented Dec. 31, 1929

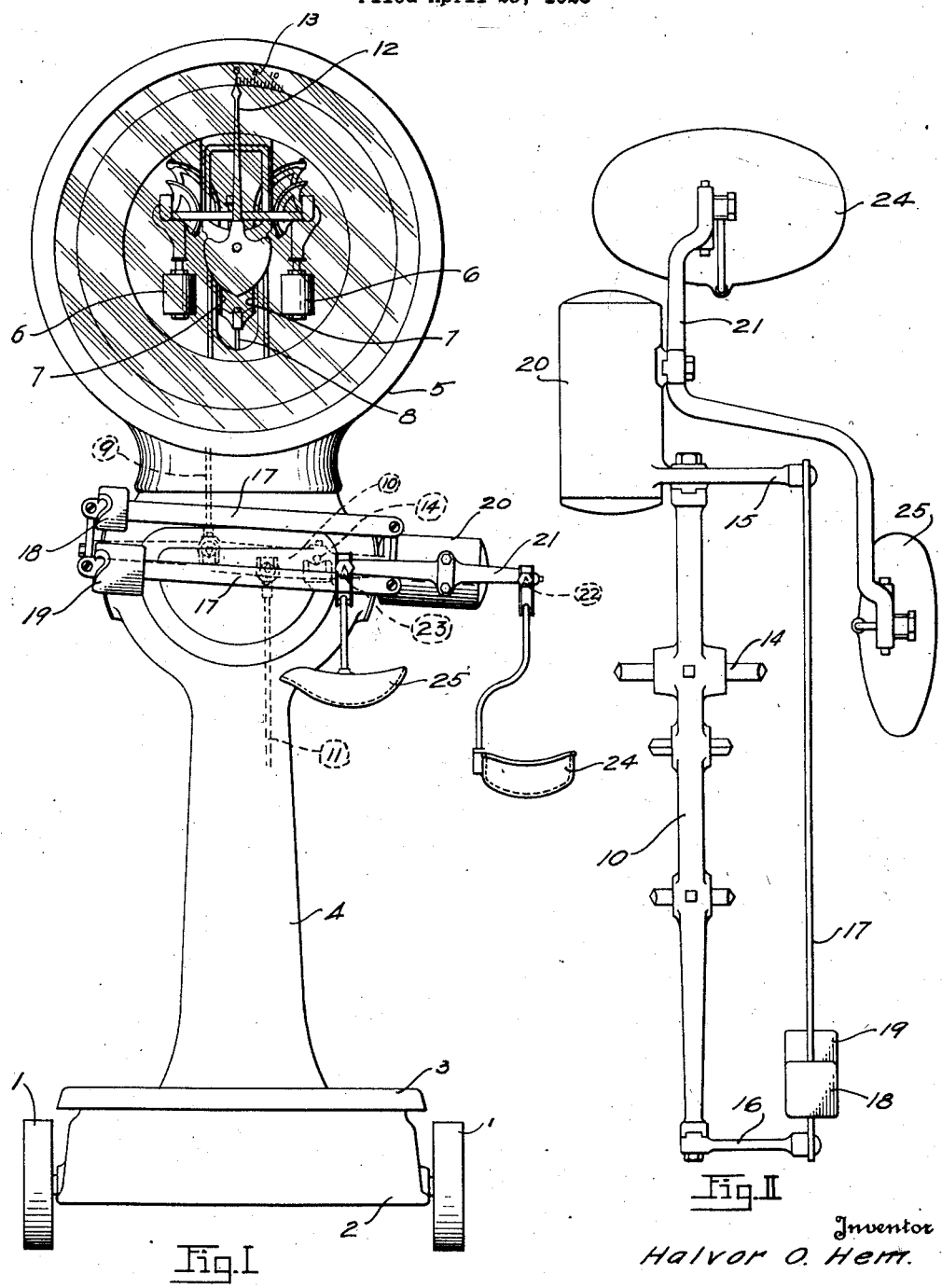

1,741,416

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

SCALE

Application filed April 23, 1928. Serial No. 272,341.

This invention relates to weighing and counting scales, particularly of the type employing automatic load-counterbalancing and indicating mechanism which is brought to a predetermined position when the load on the platform is counterbalanced by specimens of the same article.

In scales of this type, in which the ratio between the leverage of the lot of articles to be counted and the leverage of the specimens by which the lot is counterbalanced is fixed, it is necessary to count by hand the number of articles by which the lot exceeds an even hundred, or an even fifty, or twenty-five, the average number which it is necessary to count by hand depending upon whether the ratio of the leverage of the specimens and the leverage of the lot to be counted is 100 to 1, 50 to 1, or 25 to 1. It is an object of this invention to provide means whereby the number which it is necessary to count by hand is reduced to a minimum, and specifically to provide means whereby the number that it is necessary to count by hand is reduced to less than ten.

Another object of the invention is to provide a counting scale which is particularly adapted for use in connection with the making of clerical records of counts.

Another object is the provision of means whereby a weighing scale of standard construction can be converted into a counting scale of the fixed ratio pan type in which the necessary hand count is reduced to a minimum and which is particularly adapted for use in connection with the making of clerical records of counts.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevation of a weighing and counting scale embodying my invention.

Figure II is an enlarged plan view of a combined tare beam and ratio pan supporting lever forming a part of the scale of my invention.

Referring to the drawings in detail, the scale illustrated is of the so-called portable type, being provided with wheels 1 suitably mounted on the base 2 so that the scale may be easily moved about.

The commodity-receiver is in the form of a platform 3 overlying the base 2 and supported by levers (not shown) which are located within the base.

Mounted upon the base at its rear end is a column 4 and surmounting the column 4 is a dial housing 5 which contains automatic load-counterbalancing mechanism consisting of a pair of pendulums 6 connected by means of metallic ribbons 7 and rods 8 and 9 to the tare beam and counting lever, which is in turn connected by means of a rod 11, lying within the column 4, to the platform supporting levers located in the base.

When a load is placed upon the platform 3 a downward pull is transmitted through the rod 11, the lever 10, the rods 9 and 8 and the ribbons 7 which causes the pendulum 6 to swing downwardly and upwardly to positions in which the load on the platform is counterbalanced.

Connected to the load-counterbalancing mechanism by means of a rack and pinion (not shown) is an indicator 12 which swings over a chart 13 suitably graduated to indicate the load on the scale.

The tare beam and counting lever 10 is supported upon a knife-edged fulcrum pivot 14 and is provided with brackets 15 and 16 upon which are carried beams 17 with sliding poises 18 and 19 to counterbalance tare or increase the weighing capacity of the scale, and fixed to the bracket 15 is a loading box 20, the load in which may be adjusted to properly balance the scale and compensate for pendulum effect in the levers.

The scale so far outlined is similar in construction to the weighing scale shown in my United States Patent No. 1,543,768 and it has not, therefore, been illustrated or described in detail. It is to be understood that the automatic scale mechanism illustrated is merely exemplary and that the use of other forms of automatic weighing mechanism in the combination claimed is within the scope of the invention.

A ratio pan supporting bracket 21 is rigidly secured to the loading box 20 or other convenient part of the lever mechanism and suspended respectively from knife-edged pivots 22 and 23 on the bracket 21 are large and small ratio pans 24 and 25. The pivot 22, from which the large ratio pan 24 is suspended, is preferably located at such a distance from the fulcrum pivot 14 of the lever 10 that one specimen of a lot of articles in the large ratio pan will counterbalance ninety-nine similar articles on the platform 3. The pivot 23, from which the small pan 25 is suspended, is preferably located at such a distance from the fulcrum pivot 14 of the lever 10 that one specimen in the pan 25 will counterbalance nine similar articles on the platform 3.

With a weighing and counting scale constructed as above described, suppose it is desired to ascertain the weight and the number of pieces of a lot of like artices. A suitable container may, if necessary, be placed upon the platform and the weight of the container counterbalanced by means of the poises 18 of and/or 19. The lot of articles is then placed upon the scale, in the container if one be used, and the weight is automatically indicated on the dial 13. The operator then takes some of the articles from the platform and places them in the large ratio pan 24. As specimens are transferred from the platform to the large ratio pan part of the load on the platform is counterbalanced by the specimens in the ratio pan, and as the pendulums are thus relieved of part of the pull which has elevated them, they descend and the indicator hand 12 moves back toward zero position. When so many specimens have been placed in the large ratio pan that the addition of another one will cause the hand to swing beyond zero position, the operator begins placing specimens in the small ratio pan 25. As each piece is placed in the small ratio pan 25 the backward movement of the indicator hand is much less than the backward movement caused by placing a piece in the larger pan 24, but when nine or less pieces have been transferred from the platform to the small pan, the indicator will approach so nearly to zero position that the transfer of another piece will cause it to swing beyond the zero mark. The operator then takes enough pieces from the platform to cause the indicator to register as nearly as possible with the zero mark, not placing the last pieces so taken in either of the ratio pans. Each piece in the large ratio pan 24 now counterbalances ninety-nine on the platform and, therefore, accounts for one hundred pieces, including itself. Each piece in the small ratio pan 25 counterbalances nine pieces on the platform and, therefore, accounts for ten pieces, including itself. If, for example, the operator has placed fourteen pieces in the large pan, seven in the small pan and has withdrawn three more from the platform, he will know that there are fourteen hundred and seventy-three in the lot.

The scale is particularly well adapted for use in connection with the making of clerical records of weights and counts. When the scale is used, for instance, in a receiving room for weighing in and counting in parts, the receiving clerk may first enter the weight in a proper place on the receiving sheet and then enter the count by hundreds, tens and units as he transfers specimens from the platform. When he transfers the necessary number of pieces to the large pan 24, he puts down the number of pieces so transferred in the hundreds column or place; next he puts down the number of pieces transferred to the small ratio pan in the tens column or place, and in the units column he puts down the number of pieces finally withdrawn from the lot on the platform to bring the indicator hand as nearly as possible into registration with the zero mark on the chart. He will thus have entered the count on the receiving sheet.

If desired, the leverage may be made such that one piece in the large ratio pan 24 will counterbalance one hundred pieces on the platform and one piece in the small ratio pan 25 will counterbalance ten pieces on the platform. A scale of this ratio is convenient for counting successive lots of the same article. With a scale having ratios of 100 to 1 and 10 to 1 the count embraces only the pieces on the platform.

Other ratios may also be employed. For example, the parts may be so proportioned that two pieces in the large ratio pan 24 will counterbalance ninety-eight pieces on the platform 3 and two pieces in the small ratio pan 25 will counterbalance eight on the platform 3. With this arrangement the operator would record a count of one hundred for each two pieces in the large ratio pan 24 and ten for each two pieces in the small ratio pan 25. Or the parts may be so proportioned that four pieces in the large ratio pan 24 counterbalance ninety-six on the platform 3 and four in the small ratio pan 25 counterbalance six on the platform. Or the arrangement may be such that one piece in the small ratio pan 25 will counterbalance nine on the platform even though the parts are so proportioned that four pieces are required in the large ratio pan to counterbalance ninety-six on the platform or two pieces in the large ratio pan are required to counterbalance ninety-eight on the platform. Other ratios, such as 50 to 1 and 25 to 1, may be used for the large ratio pan, 5 to 1 or 10 to 1 being used for the small one.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a commodity-receiver, automatic load-counterbalancing mechanism, means connecting said commodity-receiver to said automatic load-counterbalancing mechanism, said connecting means including a lever, a bracket carried by said lever, load pivots carried by said bracket, one of said load pivots being at a substantially greater distance from the fulcrum of said lever than the other, and ratio pans supported by said load pivots.

2. In a device of the class described, in combination, a commodity-receiver, automatic load-counterbalancing mechanism, means connecting said commodity-receiver to said automatic load-counterbalancing mechanism, said connecting means including a lever, a bracket carried by said lever, load pivots carried by said bracket, one of said load pivots being at a substantially greater distance from the fulcrum of said lever than the other, ratio pans supported by said load pivots, and a tare beam carried by said lever.

3. In a device of the class described, in combination, a commodity-receiver, automatic load-counterbalancing mechanism, means connecting said commodity-receiver to said automatic load-counterbalancing mechanism, said connecting means including a lever, and two ratio pans supported by said lever at fixed distances from its fulcrum, the leverage of said commodity-receiver and pans being such that the sum of substantially uniform parts in one of said ratio pans and similar parts on said commodity-receiver counterbalanced thereby will be a multiple of 100 and the sum of such parts in the other of said ratio pans and parts on the commodity-receiver counterbalanced thereby will be a multiple of 10.

4. In a device of the class described, in combination, a commodity-receiver, automatic load-counterbalancing mechanism, means operatively connecting said commodity-receiver and said automatic load-counterbalancing mechanism, said connecting means including a lever, and two ratio pans supported by said lever at such fixed distances from the fulcrum thereof that the sum of uniform pieces on said commodity-receiver and in one of said ratio pans, which counterbalance each other, will be a multiple of 100 and the sum of such pieces on said commodity-receiver and the other of said ratio pans, which counterbalance each other, will be a multiple of 10.

5. In a device of the class described, in combination, a commodity-receiver, automatic load-counterbalancing mechanism, means operatively connecting said commodity-receiver and said automatic load-counterbalancing mechanism, said connecting means including a lever, and two ratio pans supported by said lever at such fixed distances from the fulcrum thereof that the ratio of leverage of one of said ratio pans to the leverage of the commodity-receiver is 99 to 1 and the ratio of leverage of the other of said ratio pans to the commodity-receiver is 9 to 1.

HALVOR O. HEM.